United States Patent

Civardi

[15] 3,637,415
[45] Jan. 25, 1972

[54] LEATHERLIKE MATERIAL
[72] Inventor: Frank Peter Civardi, Wayne, N.J.
[73] Assignee: Inmont Corporation, New York, N.Y.
[22] Filed: June 9, 1969
[21] Appl. No.: 831,664

Related U.S. Application Data

[63] Continuation-in-part of Ser. No. 780,477, Dec. 2, 1968.

[52] U.S. Cl. ............... 117/62, 117/135.5, 117/138.8 D, 117/161 KP
[51] Int. Cl. ........................ B44d 1/44, D06n 3/00
[58] Field of Search ............. 117/62, 63, 76 P, 76 T, 135.5, 117/138.8 D, 161 KP

[56] References Cited

UNITED STATES PATENTS

| | | | |
|---|---|---|---|
| 3,296,016 | 1/1967 | Murphy | 117/63 |
| 3,449,153 | 6/1969 | Saligny et al. | 117/63 |
| 3,000,757 | 9/1961 | Johnston | 117/63 |
| 3,214,290 | 10/1965 | Larner et al. | 117/135.5 |
| 3,387,989 | 6/1968 | West et al. | 117/76 |
| 3,100,721 | 8/1963 | Halden | 117/63 |
| 2,715,587 | 8/1955 | Armitage | 117/63 |

Primary Examiner—William D. Martin
Assistant Examiner—M. Sofocleous
Attorney—Abner Sheffer and F. W. Wyman

[57] ABSTRACT

Surface treatment of water vapor-permeable sheet having a microporous surface of thermoplastic elastomeric polyurethane by applying discrete particles (such as fine droplets) of a solution of an elastomeric polyurethane containing dispersed pigment and collapsing the microporous structure at said surface.

12 Claims, 7 Drawing Figures

10 MICRONS

LEATHERLIKE MATERIAL

This application is a continuation-in-part of my application Ser. No. 780,477 filed Dec. 2, 1968 (whose disclosure is incorporated herein) which describes the heat treatment employed in the preferred form of the present invention. In the manufacture of microporous sheets suitable for use as shoe upper material in place of natural leather, it has been suggested (French Pat. No. 1,522,739) that the surface of the sheet (having a microporous plastic, e.g., polyurethane, upper layer) be sprayed with solvent droplets so as to partially collapse the porous structure of the plastic at the surface and produce a surface whose appearance resembles natural leather and to impart to the surface an increased resistance to the ingress of liquid water through the treated surface, an increased abrasion resistance and reduced surface pore size with a reduction in the soiling tendency, while darkening the color of the surface and imparting a leatherlike "break" and "grain", like that of calf leather.

In one convenient way of carrying out the process, the microporous sheet passes underneath a spray nozzle from which the solvent, e.g., N,N-dimethylformamide ("DMF"), is sprayed as fine droplets and then directly under a blast of hot air impinging on the surface. When a black-dyed or black-pigmented sheet is used, the sprayed surface has a dark gray, matte appearance at first but when it encounters the hot blast (whose temperature adjacent the surface of the sheet may be, for example, in the range of 40°–100° C.), it takes on a much shinier and blacker appearance; this seems to be due to a heat-induced fusion or flow of the surface blend of the solvent and the polymeric material of the sheet, which blend has a lower melting point than that of the polymeric material alone.

The process has, however, certain defects. For one thing the surface of the treated material often is streaky, despite very uniform application of the spray of solvent thereto. Also, the treatment tends to reduce the cold flex life of the sheet material (when measured by the formation of outfold cracks during flex testing according to ASTM D2097–62T on a Newark Leather Finish Co. flex testing machine operated in an atmosphere at 0° C.).

In accordance with one aspect of the invention it has been found that these defects may be overcome by including in the solvent a small amount of suspended pigment and a small amount of dissolved thermoplastic elastomeric polyurethane.

By using the process of this invention the apparent streakiness can be largely or entirely overcome, and the flex life of the sheet material can be greatly improved. Furthermore by the use of the novel process of this invention these advantages, together with the desirable leatherlike appearance and "break" can be attained with relatively small amounts of solvent.

The amount of pigment used in the process is very small, less than about 1 percent based on the weight of the solvent, and usually above about 0.1 percent based on the weight of the solvent. The amount of pigment is so low that it is barely enough to give a white sheet of paper a light gray appearance, when a black-pigmented solution as described herein is applied to that sheet of paper instead of to a microporous polyurethane sheet, all other conditions being the same as those preferred in the process.

The process has thus far found its greatest utility when the pigment is black (e.g., carbon black) and the microporous sheet being sprayed contains a black dye or pigment. Examples of black pigments are carbon blacks (such as the channel black known as "Exelsior" sold by Columbian Carbon or "Superba" or other channel or furnace blacks, e.g., Columbian Carbon's Raven 11, Raven 15 and Raven 30, or Monsanto's 01 lampblack). Other pigments may be used, such as brown pigments (e.g., Mapico Brown 422 of Columbian Carbon, or combinations of Red Iron Oxide R 8098 and Yellow Iron Oxide LO 1888B, both supplied by C. K. Williams & Co.). Still other suitable pigments are DuPont's Phthalocyanine Blue BT 284D, Phthalocyanine Green GT 674D, Monastral Red RT 790D, Chloride White R 900, Monastral Scarlet RT 787D, Harmon Bon Maroon MB 13 and Interchemical Vat Yellow 212896. The pigment may be supplied as a masterbatch containing, e.g., 50 percent pigment in a thermoplastic resin compatible with the polyurethane (such as polyvinyl chloride).

The preferred solvent in the process is DMF. This may be diluted, if desired, e.g., a mixture of 50 parts DMF, 20 parts cyclohexanone and 30 parts of acetone may be employed. Another suitable solvent mixture comprises DMF and up to about 1 part of acetone per part of DMF; the presence of the acetone lowers the viscosity in a desirable manner and a large part of the acetone evaporates during the spraying operation so that the droplets contacting the surface of the sheet material are considerably richer in the active solvent (DMF), and also in dissolved polymer, than the solution being sprayed.

The amount of polymer in the solution being sprayed is generally below about 10 percent, e.g., 1, 2, 3, 5 or 8 percent.

The ratio of dispersed pigment to polyurethane in the solution being sprayed is usually within the range of about 1:50 to 1:3, preferably about 1:20 to 1:5, more preferably about 1:10.

Instead of applying the solution of polyurethane containing the pigment by spraying it can be applied by printing, using a gravure roll having very fine pattern such as a so-called "mezzo screen" pattern in which the depressed areas (which carry the solution) form a continuous network. Here one may use a somewhat more concentrated solution, e.g., one containing about 20 percent of polyurethane. The printed surface is then treated with a blast of hot air in a manner similar to the treatment given the sprayed surface, and the printing and air-blasting operations are repeated, the conditions of these treatments being so controlled that the porous structure at the surface of the sheet is attacked by the solvent so as to collapse locally in spaced small areas (where the solution is applied). The particular effect obtained will depend not only on such factors as the concentration and viscosity of the pigmented solution of polyurethane which is applied by printing but also on the solubility and porosity (e.g., pore size and density) of the microporous polyurethane material to which that solution is applied. Thus, the desired locally collapsed structure can be obtained by applying a relatively concentrated solution (e.g., a DMF solution, containing some 20 percent of the elastomeric polyurethane) to the upper surface of a two-layer microporous polyurethane sheet, whose upper layer has a specific gravity of about 0.3; applying the same solution, under the same conditions, to a single-layer microporous polyurethane sheet whose specific gravity is about 0.5 throughout would not produce the collapsed structure but would form a raised deposit instead.

In a preferred aspect of the invention the microporous sheet material is one which does not have its extensibility constrained by the presence of a reinforcing fabric such as a woven or nonwoven fibrous fabric. Throughout its thickness it consists essentially of nonfibrous elastomeric polyurethane material. Unlike the conventional leather substitutes which have ultimate elongations of some 20–40 percent, it can be stretched well over 50 percent (e.g., well over 100 percent and usually well over 200 percent). Its thickness is at least 25 mils (0.63 mm.), e.g., about 30 to 100 mils (about 0.75 to 2.5 mm.) and preferably about 30 to 70 mils (about 0.75 to 1.8 mm.). The spraying with the solution containing polymer and pigment effects no substantial change in the thickness.

In one particularly preferred process the sprayed unreinforced microporous sheet, after passing under the blast of hot air, is given a heat treatment under such conditions that the microporous sheet shrinks at least about 5 percent in area. Preferably the heat treatment is carried out at a temperature below the "collapse temperature" of the sheet and within 40° C. of said collapse temperature. (The collapse temperature is the temperature at which the sheet loses its porous structure, a phenomenon which is evidenced by the dry sheet becoming translucent or transparent). It is found unexpectedly that when the dissolved polymer is present in the sprayed solvent the heat treated product shows very much better flex life. Furthermore the flex life is found to increase as the proportion of polymer in the sprayed solvent increases; the flex life of the heat treated sheet is much better, for example, when the solvent contains 2½ percent polymer than when it contains 1 percent polymer, and still better when it contains 5 percent polymer.

The heat treatment is conveniently carried out in a stream of hot air, e.g., in suitable convection oven, while the sheet material is supported horizontally on a support which permits the desired planar shrinkage, such as a grate or a series of closely spaced rollers or an endless canvas belt. When the material being treated is in the form of a continuous sheet, little if any lengthwise tension is applied in order to move the material through the oven. The sheet material may, less desirably, be hung vertically, particularly when the width of the material is not great and the force of gravity resisting shrinkage is therefore small.

Instead of heating by convection from a hot gas, the heat may be supplied by radiation (e.g., by infrared heaters or by dielectric heaters, such as those operating at radio frequencies) or by conduction, as by passing the material over hot rolls (e.g. conventional hot "cans") or through a hot liquid medium, in such a way that the planar shrinkage occurs.

The time (duration) and temperature of the heat treatment will depend on the particular polyurethane composition; thus it should not be so high as to melt the material or cause a collapse of its pores. The time and temperature of treatment should, however, be high enough to cause an area shrinkage of above about 5 percent, e.g., in the range of about 5 to 40 percent. The temperature of the heat treatment is preferably at least 2° C. less than the collapse temperature of the microporous material, well within 40° C. of the collapse temperature and usually within 30° C. and often well within 15° C. of it (e.g., 5–15° C. less than the collapse temperature). The duration of the heat treatment is preferably relatively short, well below an hour, and usually well below 15 minutes. The optimum temperature and duration of treatment can be determined by simple experimentation and will of course depend in part on the efficiency at which the heat is transferred to and through the surface zones of the microporous material (which is itself a heat-insulating structure). Generally in a convection oven the duration is over a minute, e.g., about 3 to 5 minutes. The measurements of temperature in a convection oven are conveniently made by placing a thermocouple in the air very close to (i.e., just above) the upper surface of the sheet material.

In one particularly preferred process, little if any change in the thickness of the material is observed during the heat treatment. In another embodiment, which is especially suitable when the microporous structure, prior to heat treatment, is of lower density (e.g., about 0.2–0.3 g./cm.³) the treatment is such as to cause substantial decrease in thickness and consequent greater densification, e.g., to provide a material having a density above 0.35 g./cm.³ (such as 0.35 to 0.5). A treatment under conditions to reduce thickness may also be employed to make acceptable for certain uses an otherwise unacceptable sheet; for instance a material 1.1 mm. in thickness, which is too thick for use in place of the upper leather in ladies' lined shoes (although acceptable for other uses) may be heat treated to reduce its thickness to an acceptable 0.8 mm. Preferably the sheets are substantially free of visible pores (macropores) both before and after the heat treatment.

The heat-treated microporous sheet preferably has an apparent density in the range of about 0.35 to 0.7, and more preferably in the range of about 0.4 to 0.5 or 0.6 grams/cm.³. The specific degree of shrinkage occurring during heat treatment depends in part on the structure of the material and its previous history. The apparent density of the microporous sheet before heat treatment is preferably below about 0.5 or 0.6 e.g., in the range of about 0.35 to 0.55, grams/cm.³. Typically the density of the polyurethane itself is about 1.2; it will therefore be apparent that in the neighborhood of ¼ to ½ of the volume of the microporous material is air.

The solid polymeric material of the microporous sheets treated in accordance with this invention is a thermoplastic elastomeric polyurethane material having an intrinsic viscosity of above 0.6, preferably above 0.8, and more preferably about 1 or more. The polyurethane is composed of segments having urethane linkages and intermediate longer segments which may for example be of polyester or polyether character. The urethane linkages are preferably derived from aromatic diisocyanates, such as diphenyl methane -p,p'-diisocyanate, and are thought to provide so-called "hard" segments in the polymer molecule, while the other segments (e.g., the polyester or polyether segments) are flexible or "soft". Polyurethanes of this type are known in the art. They may be made, for instance, by reacting a relatively low molecular weight hydroxyl-terminated polyester or polyether (e.g., of molecular weight below 6,000, and preferably between 800 and 2,500) with a low molecular weight glycol and a diisocyanate.

In making the polyurethane one may employ a polyester of a hydroxycarboxylic acid (e.g., a polycaprolactone) or a polyester of a glycol and a dicarboxylic acid (e.g., ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about three to six carbon atoms in length.

Typical polyethers which are used to provide the soft segments for elastomeric polyurethanes are usually of aliphatic character. One type has the formula H (RO)$_n$H where R is a divalent alkylene radical, such as tetramethylene or ethylene or propylene, and "$n$" denotes the degree of polymerization.

The preferred diisocyanate is diphenyl methane -p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate.

The low molecular weight glycol referred to above acts as a chain extender. The preferred chain extender is tetramethylene glycol, but other chain extenders may be used as such or in admixture therewith. Examples of such other difunctional chain extenders are other dihydric alcohols such as ethylene glycol, hydroxy amines such as 2-amino-ethanol, diamines such as ethylene diamine, or water. The amount of chain extender is preferably such as to produce a thermoplastic product of high intrinsic viscosity.

In the preferred class of polyester polyurethanes made with diphenylmethane-p,p'-diisocyanate, those having nitrogen contents in the range of 4 to 5 percent, most preferably in the neighborhood of 4½ percent, (e.g., 4.4–4.6 percent) have been found to be particularly suitable.

For best results, the polyurethane material used to make the microporous sheet should have a melting point of at least 100° C. preferably above 150° C., e.g., about 170° to 200° C. (as measured by differential thermal analysis or differential scanning calorimetry). When formed into a smooth void-free thin film 0.2–0.4 mm. in thickness it should, for best results, have the properties described below; such thin films can be formed by careful casting of solutions of the polymer (e.g., a degassed 30 percent solution in dimethylformamide) followed by careful evaporation of the solvent in a dry atmosphere: a tensile strength of at least 210 kilograms per square centimeter (preferably at least 350, e.g., about 420 to 560), a percent elongation at break of at least 300 percent (preferably at least 400 percent, e.g., about 500 to 700 percent), an elastic modulus of at least 105 kilograms per square centimeter (preferably at least 350 e.g., about 560 to 770), a 100 percent secant modulus (stress divided by strain at 100 percent elongation) of at least 28 kilograms per square centimeter (preferably at least 84, e.g., about 110 to 134). These mechanical properties are measured by ASTM D882–67.

The polyurethane (again, tested as a thin film made as described above) should recover completely from a 5 percent elongation at room temperature (23° C.) but preferably does take on a permanent set (one measured for example as in an ASTM D412–66) after a 100 percent elongation. This set is usually within the range of about 5 to 20 percent; for the best materials thus far employed it is in the range of about 10 to 20 percent, e.g., about 15 percent. A typical material shows a tension set of some 24–26 percent immediately on release of the clamps after being held at the 100 percent elongation for 10 minutes while the "permanent set", which is here taken as the tension set measured 1 hour after the release of the clamps, is 14 percent (measured on a film specimen 1 cm. wide with a gage length of 5 cm. and a strain rate, for the 100 percent elongation, of 254 percent per minute). Preferably the material has a Shore hardness of at least 75A (more preferably about 90A to 60D), measured by ASTM D1706–67.

The polyurethane material may be composed of polyurethane per se. It is also within the broad scope of the invention to use polyurethane materials which are blends of polyurethanes and other high polymers such as a vinyl chloride polymer (e.g., the vinyl chloride copolymers known as Bakelite VYHH or VAGH, containing vinyl acetate as a comonomer) or a rubbery copolymer of a conjugated diolefin and acrylonitrile (e.g., the butadiene-acrylonitrile copolymer known as Hycar 1031). The amount of such other high polymer is generally below 40 percent (e.g., 10 percent or 20 percent) of the total weight of the blend.

The preferred thermoplastic elastomeric polyurethanes are understood to have few, if any, chemical cross links and are believed to derive their properties primarily from hydrogen bonding forces rather than cross linkages. Their stress-strain curves are of the same general shape as those shown in FIG. 1 of the article by Stetz and Smith in Rubber Age, May 1965 page 74. While the polyurethane itself usually shows a tension set below 100 percent, as previously discussed, the preferred microporous polyurethane sheets generally recover completely with substantially no permanent set (under standard dry conditions at room temperature) after being stretched 100 percent.

The heat-treated microporous sheet preferably has a percent elongation at break of above 50 percent (e.g., in the range of about 300 to 400 percent or more); a tensile strength above 35 Kg./cm.$^2$ (e.g., in the range of about 60 to 100); an elastic modulus above 2 Kg./cm.$^2$ (e.g., in the range of about 4 to 9), and a slit tear strength (ASTM D2212-64) above 1 Kg. per mm. thickness (e.g., in the range of about 2 to 5). Desirably the microporous sheet, before heat treatment, should have a percent elongation at break above 50 percent, more preferably 70 percent or higher and a tensile strength of at least 5 Kg./cm.$^2$. Both before and after the heat treatment it should permit the passage of water vapor (thus its water vapor transmission should be at least 200 g./m.$^2$/24 hrs. (measured as in ASTM E 96-66, procedure B).

The "microporous" materials used in the process of this invention have pores invisible to the naked eye of a person with 20/20 vision. Such pores measure less than 100 microns in their maximum dimension (when a plane surface, such as the top or bottom of the material or a cross section thereof is observed). As will be seen hereafter, the pores generally measure well below 50 microns in their maximum dimension.

A preferred type of product is illustrated in FIGS. 1 to 4 of the drawings which are photomicrographs obtained with a scanning type electron microscope (Type JSM, Japan Electron Optics Laboratory Co., Ltd.), viewing cross sections of the sheet material (obtained by cutting perpendicularly through the thickness of the sheet with a razor). In preparation for viewing the cut sheet material is given a very thin uniform metallic (gold-palladium) coating about 300 Angstroms in thickness; the coating may be applied by evaporating the metal onto the specimen in a high vacuum (e.g., $10^{-4}$ mm. Hg absolute), the specimen being rocked while metal deposition is occurring, so as to distribute the metal uniformly over the surface, including the crevices, of the specimen. This coating serves to conduct away the electron charge which would otherwise accumulate on the surface of the specimen when it is exposed to the electron beam in the scanning electron microscope. The approximate scale is indicated for each photomicrograph. In viewing the photomicrographs it should be borne in mind that the scanning type electron microscope has a great depth of focus (nearly 300 times that of the light microscope) such as about 300 microns at 100X magnification or 100 microns at 1,000X magnification, enabling one to, in effect, see into the interiors of the pores.

In the microporous sheet shown in the drawing the pore system comprises cavities 12 (FIGS. 1, 2 and 3) having their maximum dimensions in the range of up to about 45 microns connected by passages 13 which may have much smaller dimensions (e.g., maximum dimensions apparently as low as about ½ micron). The walls of the cavities may be very thin, such as the wall seen between the two cavities at the upper right hand portion of FIG. 1; it will be understood that other walls present in FIG. 1 are seen broadside, or at an angle, so that their thinness is not readily apparent. The thickness of the walls appears to be on the order of 1 to 10 microns. Fine cavities 14 may also be present in the walls of the irregular cavities 12. One suitable method for making such a structure is by forming, as on a temporary support, a thick layer of a mixture of a leachable material (such as microscopic sodium chloride particles) and a solution of the thermoplastic polyurethane in a solvent (e.g., dimethylformamide) and treating the layer on the support with a liquid coagulant-leaching agent (e.g., water) which is a non-solvent for the polyurethane and at least partially miscible with the solvent, so as to coagulate the polyurethane into a microporous sheet; the treatment with the coagulant is continued until substantially all the solvent and leachable material are removed; the resulting water vapor permeable flexible sheet material is dried and stripped from the temporary support.

As will be seen from FIGS. 1 to 4 the volume of the sheets illustrated therein is largely taken up by cavities of generally rounded or compact (not highly elongated) shape, whose maximum dimensions are in the range of about 10 to 45 microns, connected by smaller passageways. It will be appreciated that in any cross-sectional slice some cavities will be cut along a diametral plane, (so that their full diameters will be apparent) while others will be cut on one side or the other of a diametral plane (so that the apparent diameter of such cavities on the photograph may be considerably less than their actual diameters).

In each of the Figures the scale of the photograph is shown. FIGS. 1, 2 and 3 are views taken at an angle of about 100° to the plane of the cross section. The angle is such that a small portion of the uncut top surface of the material can be seen at a low angle, i.e., an angle of some 5°.

Figure 2:
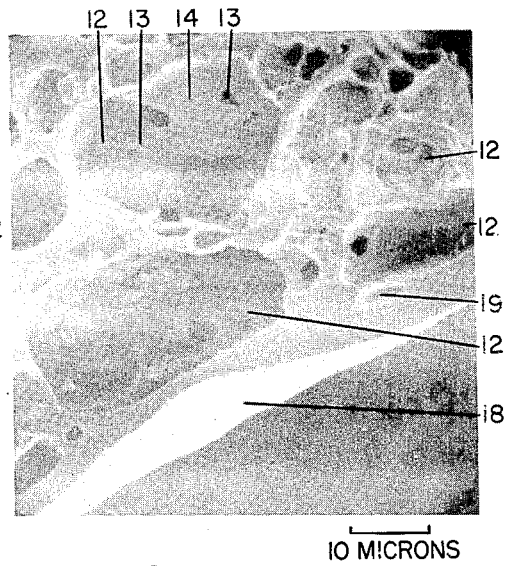
FIG. 2 shows the zone adjacent to the surface of a similar microporous sheet after spraying with the solvent-polymer-pigment mixture in accordance with this invention. It will be seen that the microporous material shows a thin surface skin 17, some 12 microns thick.
Figure 3:
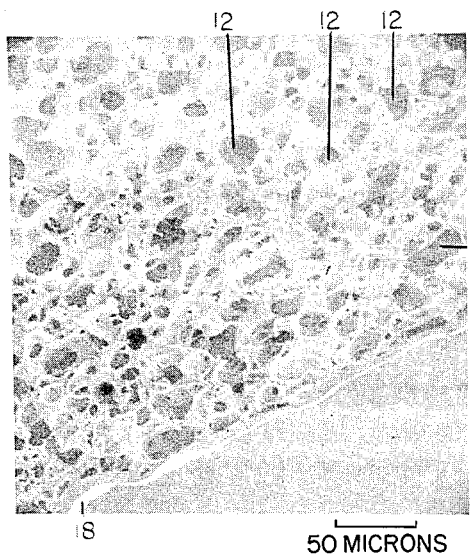
FIG. 3 is a view of the same material as in FIG. 2 but at a smaller magnification.

It will be seen that in FIGS. 2 and 3 there are saucerlike surface depressions. A portion of the uncut surface of a depressed area 18, having at least one micropore 19, is visible in FIG. 2; the apparent diameter of that depressed area, as seen in FIG. 2, is about 135 microns and its apparent depth (taking into account the fact that the surface is viewed at an angle of about 5°, as previously mentioned) is on the order of 13 microns.

Figure 1:
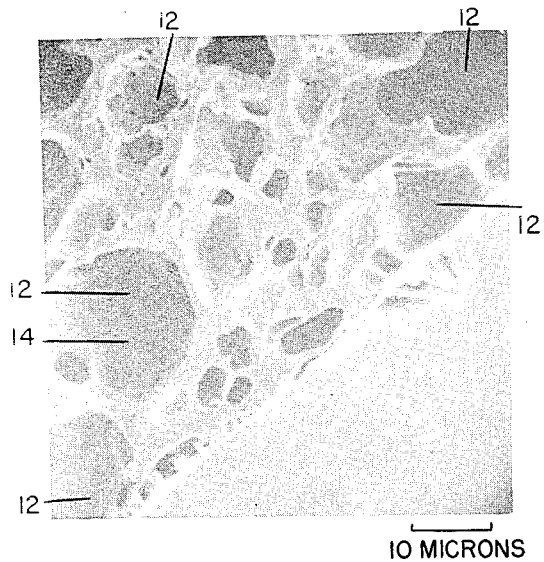
FIG. 1 shows the zone adjacent to the surface of an unsprayed microporous sheet of the type preferred for use in this invention.
Figure 4:
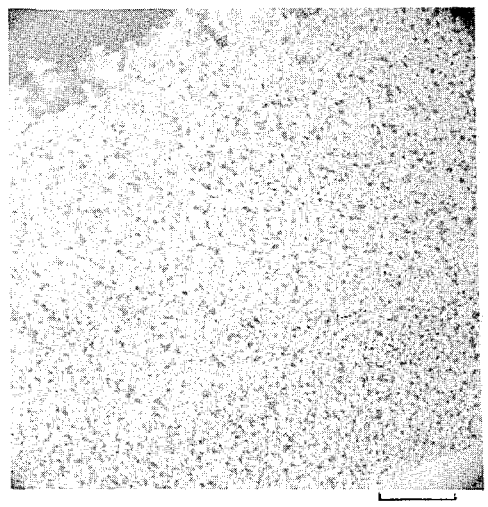

FIG. 4 is a view of the entire thickness of the sheet shown in FIG. 1, at a much lower magnification, taken at an angle of 90° to the plane of the cross section.

Figure 5:
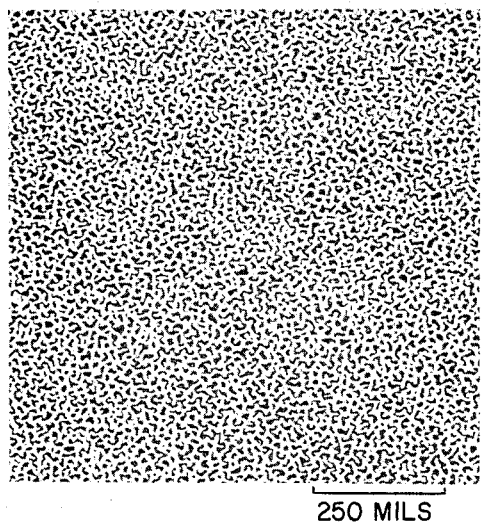
Figure 6:
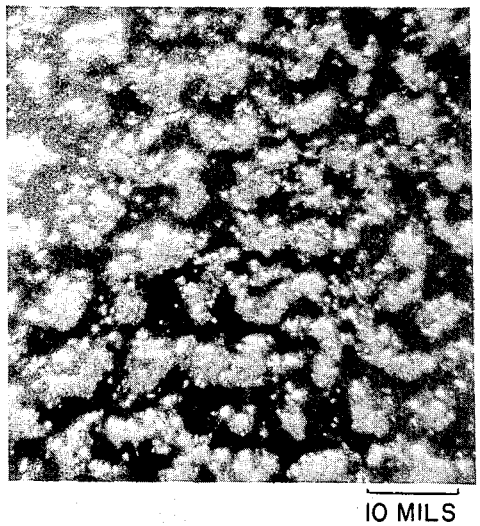
Figure 7:
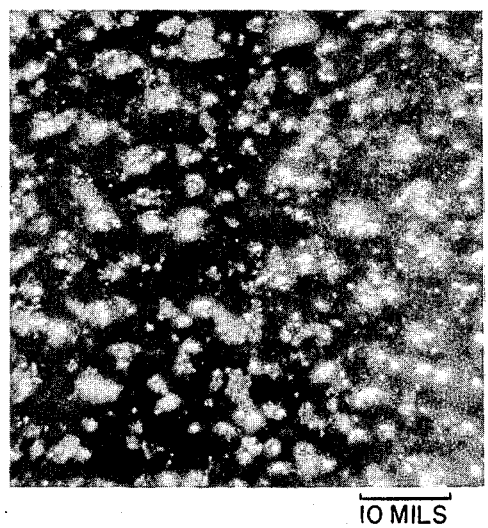

FIGS. 5, 6 and 7 relate to the embodiment, described above, in which the solution is applied by printing instead of by spraying.

FIG. 5 is a photomicrograph of a portion of the surface of the "mezzo screen" patterned intaglio printing roller. The white areas are the depressed "ink"-receiving area.

FIGS. 6 and 7 are photomicrographs looking down on the surface the microporous material which has been given one "-printing" and hot air blast treatment (FIG. 6) or two such treatments (FIG. 7). The black areas are the collapsed areas of the surface. It will be apparent from FIG. 6 that practically all of the black "printed" areas are principally bounded by the adjacent white unprinted areas and that these black areas, although they are interconnected (forming a fine continuous network), are functionally discrete. Similarly the white ink-receiving areas of the surface of the intaglio roller (shown in FIG. 5) are principally bounded by the black raised areas and are thus also functionally discrete.

The microporous sheet material to be treated in accordance with this invention is preferably colored, at least at its upper surface. To this end the polyurethane material forming the sheet may contain a small amount of pigment (e.g., carbon black) or the sheet may be dyed with a solution of a solvent dye (such as "Irgacet" dye, which may be of the type described in U.S. Pat. No. 2,551,056, dissolved in methanol).

In one preferred embodiment the thermoplastic polyurethane material present in the spray is of substantially the same type as that constituting the microporous sheet. It may also be desirable to use for this purpose a polyurethane made from an aliphatic diisocyanate, such as hexamethylene diisocyanate or tetramethylene diisocyanate, giving a polyurethane which is itself substantially free of discoloration and resistant to oxidation and development of color. An antioxidant and/or a stabilizer against deterioration by ultraviolet light may also be included in the spraying solution.

The invention is most useful in making substitutes for shoe upper leather. In the manufacture of shoes, it is customary to cut the upper leather, usually with a die by machine, and to fit and assemble the parts of the upper together (including any double or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, (e.g., at the toe and sides.

During the fitting together of the upper, the edges of the upper leather are generally "skived", by cutting a bevel on the "flesh side" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made" 3rd edition, copyright 1966 by United Shoe Machinery Corporation.

Excellent shoes have been made with materials produced in accordance with this invention in place of the usual upper leather. The upper not only conforms unusually well to the last, without wrinkling or puckering, but also retains its lasted shape very well after removal from the last, particularly when the upper has been given the conventional type of heat setting treatment (e.g., setting with heat alone or moist heat) on the last. The material has very good skiving characteristics, particularly if it is wet with water prior to skiving. The shoes are comfortable and the uppers show very good wear resistance. Unlike many shoes made with the conventional fabric-reinforced leather substitutes, there is no problem of fabric show-through or orange peel on lasting.

The following examples are given to illustrate this invention further. In the examples all pressures are atmospheric unless otherwise indicated. In the application all proportions are by weight unless otherwise indicated.

EXAMPLE 1

A microporous elastomeric polyurethane sheet 1 mm. thick and weighing about 510 grams per square meter is made from a polyester polyurethane prepared by reacting Desmophen 2,001 polyester (a hydroxyl-terminated polyester of 2,000 molecular weight made from 1 mol butane diol-1,4, 1.13 mol ethylene glycol and 2 mols adipic acid), 1,4-butanediol (as a chain extender), diphenylmethane-p,p'-diisocyanate, and methanol (as a chain terminator), all dissolved in N,N-dimethylformamide ("DMF") under such conditions and in such proportions as to produce a 30 percent solution of an unreactive polyester polyurethane having an intrinsic viscosity of 1.0 (measured in DMF) a polyester content of 50.3 percent and a nitrogen content of 4.4 percent.

In the manufacture of the microporous material the polyurethane solution is mixed with micropulverized sodium chloride in a ratio of 1.78 parts of salt per part of polyurethane, the solution is degassed, cast on a porous temporary support, and immersed in water to coagulate the cast layer and to extract the salt and then dried and removed from the temporary support.

The microporous material is then dyed black by passing it through a bath of methanol having dissolved therein 4 percent of nonionic surface active agent ("Igepal CO210") and 0.5 percent of a black dye ("Irgacet Black RL") being immersed in the bath for 38 seconds, then squeezed between rollers to express excess liquid, and passed through a hot air oven having an air temperature of 265° F. to drive off the methanol, being in the oven for 1½ minutes. In the process the dry weight of the material increases about 4 percent indicating that it contains about 0.5 percent of the dye.

The dyed material is then passed under a spray of a solution containing 95.98 percent DMF, 3.66 percent polyurethane (identical with that used to make the microporous sheet) and 0.36 percent Excelsior carbon black. In the spraying operation the solution is atomized with air under pressure (80 p.s.i.g.) in a standard spray gun situated 12 inches above the microporous sheet so that about 10 cc. of solution is applied per square foot. Just as it is leaving the spray zone the sprayed sheet encounters a blast of hot air directed at its upper surface at a small angle (e.g., an angle of some 15° so that the blast is almost parallel to the upper surface of the sheet. The air is supplied from a flattened tube (a "fishtail") whose outlet is about 2 inches above the sheet and about 12 inches from the center of the spray gun, measured horizontally along the path of the moving sheet, which is moving at 5 feet per minute. The temperature of the air blast (measured at a point just above the surface of the sheet) is 180° F. (82° C.). The hot air blast serves to fuse the DMF-containing polyurethane at the surface of the sheet. The spraying is carried out so that each area of the top surface of the sheet is passed twice under the spray and air blast.

The sheet then passes through a hot air oven (having an air temperature, in a first zone of 93° C. and, in a second zone of 121° C.) to drive off residual DMF; the residence time in the oven is 3 minutes. The product has a black lustrous but fine-grained appearance like that of smooth fine black calf. Its thickness is about the same as that of the original sheet. Its water vapor transmission is about 310 g./m.²/24 hours (ASTM E 96-66 Procedure B) as compared to 434 g./m.²/24 hours for the original sheet.

EXAMPLE 2

In this example the microporous material is a two-layer material about 2 mm. thick made in a manner similar to that of Example 1 except that two mixtures of different salt contents (salt:polymer ratios of 1.78:1 and 3:1) are cast, one on top of the other (with the material of higher salt content on top) onto the porous temporary support and the whole cast material is immersed in the water to coagulate the polyurethane and extract the salt. The two layers have a similar appearance when viewed in cross section with the electron scanning microscope, but the proportion of voids is, of course, higher in the upper layer. The less dense upper layer is about 0.4 mm. thick. The density of the two layer sheet is about 0.412 g./cm.$^3$.

The sheet is dyed as in example 1, (using a 35 second immersion time and a higher squeezing pressure, and an oven air temperature of 270° F.) and increases 4.4 percent in dry weight. It is then sprayed as in example 1 (again with two spraying passes), using a spray gun situated 13 inches above the sheet and a blast of hot air supplied from a fishtail positioned 2 inches above the sheet and about 12 inches from the center of the spray gun (measured horizontally as in example 1), the air being supplied at a velocity of 5,000 ft. per minute and the blast having a temperature (measured at a point just above the surface of the sheet) of about 80° C. In passing through the oven to drive off excess DMF the sheet first encounters air supplied at 200° F. (93° C.) and then air supplied at 240° F. (116° C.).

EXAMPLE 3

12.9 parts of a 31 percent solution of a polyurethane of the type described in example 1 is thoroughly mixed with 7.1 parts of DMF and 0.4 part of Superba black. 7.52 parts of the resulting blend is mixed with 43.24 parts of additional DMF, 34.53 parts of dimethylcyclohexanone and 14.71 parts of acetone. This mixture is sprayed onto the dyed sheet described in example 2 while hot air is supplied from a fishtail, being directed against the surface of the sprayed sheet. The temperature of the air measured two inches inside the fishtail is about 110° C., but after it leaves the fishtail it mixes with the cooler ambient air (which also happens in the other examples) so that the temperature of the hot air blast just above (e.g., 1 inch above) the surface of the sheet is probably about 80° C. After drying in a hot air oven the sheet material is given a heat treatment, while free to shrink in its planar direction, by passing it (suitably supported) through an oven having an air temperature of 160° C. the residence time in the oven being 5 minutes.

As indicated, the invention has its greatest utility in the treatment of unreinforced microporous polyurethane elastomer sheet material. In its broader aspects, however, the invention may be applied to microporous sheets which comprise a woven or nonwoven fabric backing coated with, and usually impregnated with, microporous polyurethane elastomer material. In this case the microporous layer overlying the impregnated fabric layer is usually relatively thin, (e.g., below 25 mils (0.63 mm.) e.g., 0.2 to 0.4 mm.) although the total thickness of the sheet material (including the fabric body layer or reinforcement) is about the same as that of applicant's preferred unreinforced polyurethane sheet material. In one embodiment, there may be formed on the fabric base layer a microporous layer of polyurethane material having a relatively low apparent density (e.g., a layer 0.5 mm. thick having an apparent density of 0.3 or 0.4 g./cm.$^3$).

It is understood that the foregoing detailed description is given merely by way of illustration and that variations may be made therein without departing from the spirit of the invention.

I claim:
1. Process for the production of flexible microporous sheet material having a leatherlike finish which comprises treating a surface of a flexible sheet material which surface consists essentially of preformed solid water vapor-permeable microporous thermoplastic elastomeric polyurethane material by contacting said surface locally with discrete particles of a solution of an elastomeric polyurethane containing dispersed pigment in a solvent for said microporous polyurethane, said solution containing at least 1 percent of polyurethane in said solvent, and bringing the surface carrying said solvent, before removal of said solvent, to an elevated temperature, by raising the temperature of the atmosphere adjacent to said surface to above 40° C. but below the melting point of the polyurethane material to collapse the microporous structure locally at said surface and effect heat-induced fusion of the solvent-containing surface to form a thin water vapor-permeable fused layer of polyurethane at said surface, and drying to remove the solvent by evaporation.

2. Process as in claim 1 in which said solution is supplied by spraying droplets thereof onto said surface.

3. Process as in claim 2 in which said solvent-carrying surface is heated by a blast of hot air so that the atmosphere adjacent said surface is at a temperature above 40° C.

4. Process as in claim 3 in which the solvent is dimethylformamide.

5. Process as in claim 4 in which the dimethylformamide solution, as sprayed, contains acetone.

6. Process as in claim 4 in which the concentration of said polyurethane in the solvent is about 1 to 10 percent and the ratio of the amounts of said pigment and said polyurethane in said solution is within the range of about 1:50 to 1:3.

7. Process as in claim 6 in which the said ratio is within the range of about 1:20 and 1:5 and said pigment is carbon black.

8. Process as in claim 1 in which the treated microporous sheet material is then heat-treated at a temperature below the collapse temperature of said sheet material and within 40° C. of said collapse temperature to cause said sheet material to shrink at least about 5 percent in area.

9. Process as in claim 1 in which said thin fused layer is a skin up to about 12 microns thick, said discrete particles contain 5 percent to about 20 percent of polyurethane and said temperature of the atmosphere adjacent to said surface is in the range of 40° to 100° C.

10. Process as in claim 9 in which the polyurethane in said solution is a thermoplastic elastomer.

11. Process as in claim 9 in which the polyurethane in said solution is a thermoplastic polyester polyurethane having the following properties when formed into a smooth void-free film 0.2–0.4 mm. thick: a percent elongation at break of at least 300 percent and a tensile strength of at least 210 kilograms per square centimeter.

12. Process as in claim 9 in which the polyurethane in said solution is a thermoplastic polyester polyurethane having the following properties when formed into a smooth void-free film 0.2–0.4 mm. thick: a percent elongation at break of 300 to 700 percent and a tensile strength of 210 to 560 kilograms per square centimeter.

* * * * *